(12) United States Patent
Drobot et al.

(10) Patent No.: US 9,401,089 B2
(45) Date of Patent: Jul. 26, 2016

(54) ROAD WEATHER HAZARD SYSTEM

(71) Applicant: University Corporation for Atmospheric Research, Boulder, CO (US)

(72) Inventors: Sheldon Drobot, Boulder, CO (US); Michael Chapman, Arvada, CO (US); Amanda Anderson, Boulder, CO (US); Gerry Wiener, Boulder, CO (US); Seth Linden, Westminster, CO (US); Crystal Burghardt, Evergreen, CO (US)

(73) Assignee: University Corporation for Atmospheric Research, Boulder, CO (US)

( * ) Notice: Subject to any disclaimer, the term of this patent is extended or adjusted under 35 U.S.C. 154(b) by 101 days.

(21) Appl. No.: 14/513,526

(22) Filed: Oct. 14, 2014

(65) Prior Publication Data

US 2015/0109146 A1    Apr. 23, 2015

Related U.S. Application Data

(60) Provisional application No. 61/893,653, filed on Oct. 21, 2013.

(51) Int. Cl.
*G08G 1/09* (2006.01)
*G08G 1/0967* (2006.01)
*G08G 1/01* (2006.01)
*G01W 1/14* (2006.01)

(52) U.S. Cl.
CPC ........... *G08G 1/096775* (2013.01); *G01W 1/14* (2013.01); *G08G 1/012* (2013.01); *G08G 1/0112* (2013.01); *G08G 1/0116* (2013.01); *G08G 1/0133* (2013.01); *G08G 1/0141* (2013.01); *G08G 1/096716* (2013.01)

(58) Field of Classification Search
None
See application file for complete search history.

(56) References Cited

U.S. PATENT DOCUMENTS

| | | | | |
|---|---|---|---|---|
| 3,836,846 A | * | 9/1974 | Overall | F25D 21/02 324/643 |
| 6,181,324 B1 | * | 1/2001 | Lamb | G01W 1/02 345/156 |
| 8,599,013 B1 | * | 12/2013 | Baron, Sr. | H04W 4/021 340/539.1 |

(Continued)

OTHER PUBLICATIONS

Drobot, Sheldon; Chapman, Michael; Schuler, Elena; Wiener, Gerry; Mahoney, William; Pisano, Paul; McKeever, Benjamin; Improving Road Weather Hazard Products with Vehicle Probe Data—The Vehicle Data Translator Quality-Checking, Paper from TRB 2010 Annual Meeting CD-ROM.

*Primary Examiner* — Ojiako Nwugo
(74) *Attorney, Agent, or Firm* — The Ollila Law Group LLC

(57) ABSTRACT

A method and system for assessing road conditions is provided. The method includes determining a road hazard condition for a road segment that may include a precipitation type, a pavement condition, and a visibility level. The precipitation type may be determined using radar data, satellite cloud classification data, weather station air temperature data, wiper status, mobile air data, speed ratio, or headlight status. The pavement condition may be determined using pavement temperature, precipitation type, automatic brake system status, traction status or a stability control observation, and a yaw rate. The visibility level may be determined using wind speed, relative humidity, percentage of fog lights on, percentage of high beams on, speed ratio, station visibility, station-reported visibility type, wildfire existence, wind direction, a dust existence indicator.

17 Claims, 7 Drawing Sheets

(56) References Cited

U.S. PATENT DOCUMENTS

| | | | | |
|---|---|---|---|---|
| 2002/0118118 A1* | 8/2002 | Myllymaki | G01C 21/20 | 340/686.1 |
| 2004/0080430 A1* | 4/2004 | Videtich | G08G 1/096716 | 340/905 |
| 2010/0302774 A1* | 12/2010 | Van As | H04N 9/3138 | 362/231 |
| 2013/0080371 A1* | 3/2013 | Harber | G06F 17/30752 | 706/50 |
| 2013/0218427 A1* | 8/2013 | Mukhopadhyay | B60W 40/09 | 701/51 |
| 2013/0304379 A1* | 11/2013 | Fulger | G01C 21/3415 | 701/533 |
| 2014/0062725 A1* | 3/2014 | Maston | G08G 1/0112 | 340/905 |
| 2014/0067265 A1* | 3/2014 | Maston | G01C 21/3697 | 701/533 |
| 2014/0067270 A1* | 3/2014 | Gail | G01W 1/00 | 702/3 |
| 2015/0154864 A1* | 6/2015 | Hainzlmaier | G08G 1/09626 | 340/905 |
| 2015/0178572 A1* | 6/2015 | Omer | G08G 1/0112 | 382/108 |

* cited by examiner

ROAD WEATHER HAZARD SYSTEM

CROSS-REFERENCE TO RELATED APPLICATION

This application claims priority from U.S. Provisional Patent Application No. 61/893,653, filed Oct. 21, 2013, entitled "Road Weather Hazard System," the contents of which are incorporated herein by reference.

GOVERNMENT LICENSE RIGHTS

This invention was made with Government support under contract number DTFH61-08-D-00012 awarded by the U.S. Department of Transportation. The Government has certain rights in the invention.

TECHNICAL FIELD

The present application relates to driving information systems, and more particularly, to a road and weather hazard system.

BACKGROUND OF THE APPLICATION

Adverse weather conditions have a major impact on the safety and operation of roads, from signalized arterials to Interstate highways. Weather affects driver behavior, vehicle performance, pavement friction, and roadway infrastructure. Weather events and their impacts on roads can be viewed as predictable, non-recurring incidents that affect safety, mobility and productivity. Weather affects roadway safety through increased crash risk, as well as exposure to weather-related hazards. Weather impacts roadway mobility by increasing travel time delay, reducing traffic volumes and speeds, increasing speed variance, and decreasing roadway capacity. Weather events influence productivity by disrupting access to road networks, and increasing road operating and maintenance costs.

Previous systems that provide current travel and road information to travelers include state 511 sites. Road-specific data that are presented on the 511 site are typically submitted by maintenance worker's reports of conditions experienced. The 511 site data are generally only applicable for wide stretches of roadway, and are frequently multiple hours old.

Other prior road hazard warning systems require mobile data to function and fail to take full advantage of ancillary information available such as dual-polarization radar, which can detect precipitation type, the Naval Research Laboratory cloud classification satellite data, weather station observations, ground cover information, and precipitation history. Without the use of this additional ancillary input data, it is not possible to produce high quality, physically-relevant inferences of weather conditions along the roadway.

What is needed is an increasingly accurate, reliable and precise system for assessing and communicating weather and road hazard information to travelers that integrates more of the available data sources.

SUMMARY OF THE APPLICATION

A method for assessing a road hazard condition is provided according to an embodiment. The method includes the step of receiving remote weather data. The method further includes the step of determining a precipitation type for a road segment using the remote weather data. The method further includes the step of determining a road hazard condition for the road segment using the precipitation type.

A system for assessing a road hazard condition is provided according to an embodiment. The system includes a precipitation type module to receive remote weather data for the road segment, to determine a precipitation type for the road segment using the remote weather data, and to determine a road hazard condition for the road segment using the precipitation type A system for assessing a road hazard condition for a road segment is provided according to an embodiment of the application. The system includes a pavement condition module to receive a pavement temperature, to determine a pavement condition based on the pavement temperature, and to determine the road hazard condition for the road segment using the pavement condition.

DETAILED DESCRIPTION OF THE APPLICATION

FIGS. 1-9 and the following description depict specific examples to teach those skilled in the art how to make and use the best mode of the application. For the purpose of teaching inventive principles, some conventional aspects have been simplified or omitted. Those skilled in the art will appreciate variations from these examples that fall within the scope of the application. Those skilled in the art will appreciate that the features described below may be combined in various ways to form multiple variations of the application. As a result, the application is not limited to the specific examples described below, but only by the claims and their equivalents.

Figure 1:
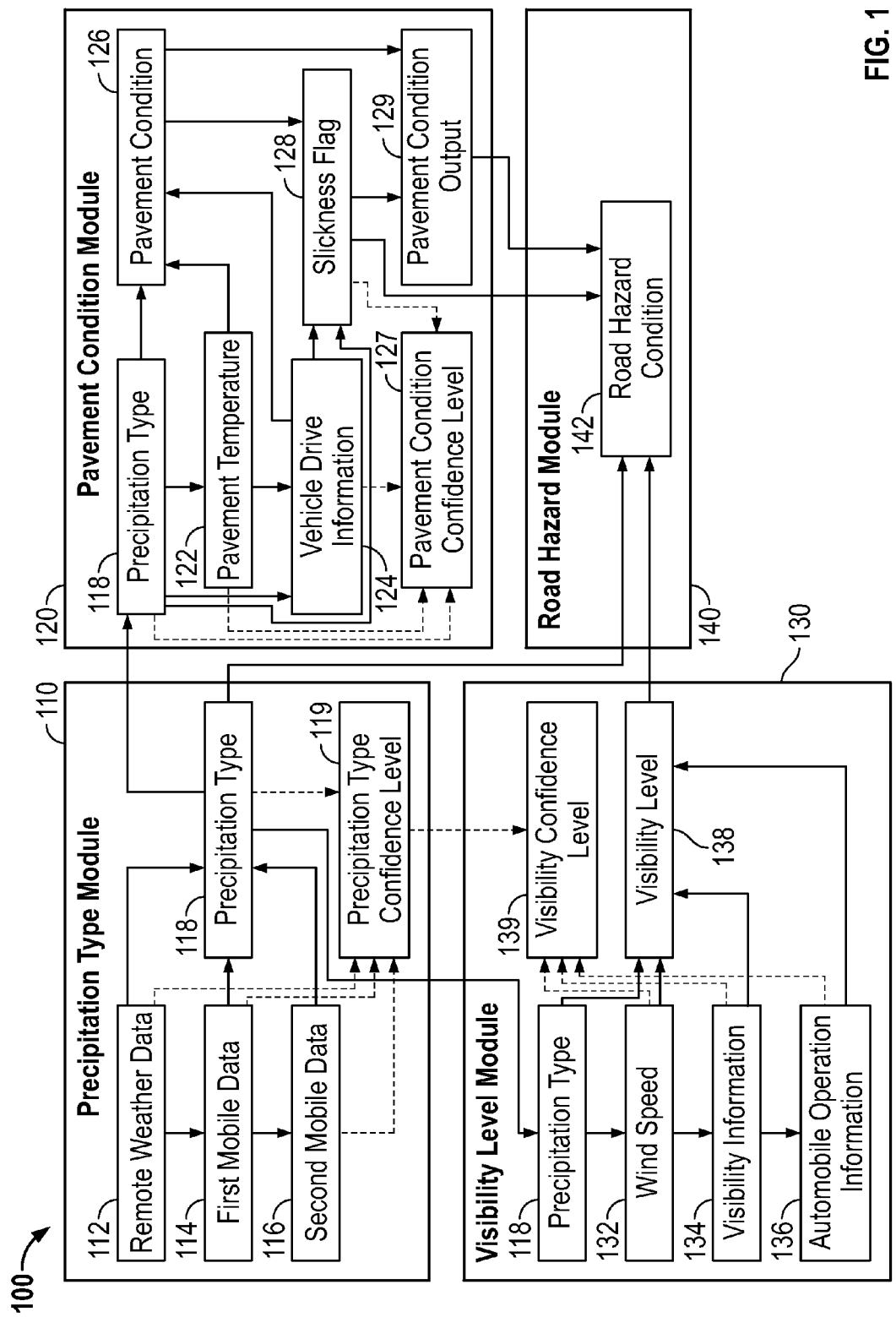
FIG. 1 depicts a road hazard system 100, in accordance with an embodiment of the application.

FIG. 1 depicts a road hazard system 100, in accordance with an embodiment of the application. System 100 includes a precipitation type module 110, a pavement condition module 120, a visibility level module 130, and a road hazard module 140. System 100 may include one, or fewer than all of precipitation type module 110, Pavement condition module 120, and visibility level module 130. In embodiments, system 100 may include road hazard module 140 with any of the above-mentioned combinations. This application further contemplates further modules may be included that are not depicted in system 100.

As may be seen in FIG. 1, precipitation type module 110 may generate precipitation type 118 using remote weather data 112, first mobile data 114, and/or second mobile data 116, as depicted with solid connector lines. Precipitation type module 110 may also generate precipitation type confidence level 119 using remote weather data 112, first mobile data 114, second mobile data 116, and/or precipitation type 118, as depicted with broken connector lines.

As may be further seen in FIG. 1, pavement condition module 120 may generate pavement condition 126, using precipitation type 118, a pavement temperature 122, and/or vehicle drive information 124, as depicted with solid connector lines. Pavement condition module 120 may further generate slickness flag 128, and pavement condition output 129 using precipitation type 118, vehicle drive information 124, and/or pavement condition 126, as depicted with solid connector lines. Pavement condition module 120 may also generate pavement condition confidence level 127 using precipitation type 118, a pavement temperature 122, vehicle drive information 124, and/or slickness flag 128, as depicted with broken connector lines As may be further seen in FIG. 1, visibility level module 130 may generate visibility level 138 using precipitation type 118, wind speed 132, visibility information 134, and/or automobile operation information 136, as depicted with solid connector lines. Road hazard module 140 may determine a road hazard condition 142 using precipitation type 118, pavement condition 126, slickness flag 128, pavement condition output 129, and/or visibility level 138, as depicted with solid connector lines. Visibility level module 130 may also generate visibility confidence level 139 using wind speed 132, visibility information 134, automobile operation information 136, and/or precipitation type confidence level 119, as depicted with broken connector lines.

A detailed discussion of each of precipitation type module 110, pavement condition module 120, visibility level module 130, and road hazard module 140 is provided in the description below.

Figure 2:
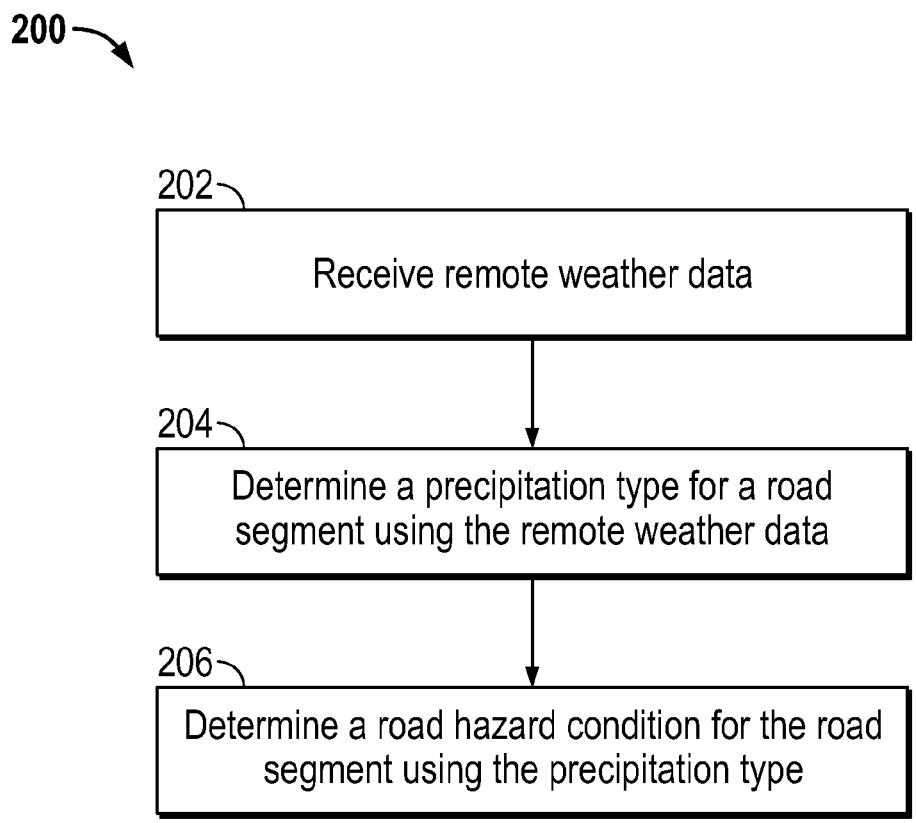
FIG. 2 depicts a method 200 for assessing road conditions, in accordance with an embodiment of the application.

FIG. 2 depicts a method 200 for assessing road conditions, in accordance with an embodiment. Method 200 is an example embodiment of precipitation type module 110 of system 100.

Method 200 begins with step 202. In step 202, remote weather data is received. For example, remote weather data 112 may be received. Remote weather data 112 includes data that is received via ancillary sources that may typically be used for weather observations. Remote weather data 112 may include, but is not limited to: radar data, satellite cloud data, weather station air temperature data. Radar data may include any type of radar typically used in weather observations, for example dual-polarization radar data. Satellite cloud classification data may include any type of satellite data commonly used in weather observations, for example the Naval Research Laboratory cloud classification satellite data. Weather station air temperature data may be received from any type of surface or in situ weather station. For example weather station air temperature data may be received from the Rapid Update Cycle Surface Assimilation System (RSAS). In further embodiments, remote weather data 112 received by precipitation type module 110 may include other ancillary weather observation data.

Method 200 continues with step 204. In step 204, a precipitation type is determined for a road segment using the remote weather data. For example, precipitation type 118 may be determined using remote weather data 112. A road segment is any portion of a road for which a road or weather hazard may be identified. For example, a road segment may be a one mile long segment of a road. In an embodiment, based on remote weather data 112, precipitation type 118 may be determined to be: 'no precipitation', 'precipitation', 'snow', 'mix', 'rain', 'light precipitation', 'moderate precipitation', 'heavy precipitation', 'light snow', 'moderate snow', 'heavy snow', 'light mix', 'moderate mix', 'heavy mix', 'light rain', 'moderate rain', 'heavy rain', or 'road splash', in addition to other precipitation types. The type 'precipitation' is a catch-all that may include any type of precipitation. The precipitation type 'mix' may include a mix of 'snow' and 'rain'.

In an example embodiment of precipitation type module 110, there may be five combinations of remote weather data 112 that may be received and used to make a first level determination of precipitation type. The precipitation type 118 determined may depend upon the types of remote weather data 112 received and/or the values of the remote weather data 112 received.

In a first case of a first level of determining precipitation type 118, remote weather data 112 may include only radar data. The radar data may include dual-polarization radar data. If polarimetric radar data is received, the hydrometeor identification may be used to determine the precipitation types 'snow', 'rain', or 'no precipitation' if there is no meteorological return. For the precipitation type 'snow' or 'rain', the horizontal reflectivity may be used to further determine precipitation intensity. For example, if the hydrometeor data identifies the precipitation type 'snow', a horizontal reflectivity of less than 10 dBZ may determine 'light snow', over 20 dBZ may determine 'heavy snow', and between 10 and 20 dBZ may determine 'moderate snow'. If the hydrometeor data identifies the precipitation type 'rain', a horizontal reflectivity of less than 20 dBZ may determine 'light rain', over 40 dBZ may determine 'heavy rain', and between 20 and 40 dBZ may determine 'moderate rain'.

If the radar data does not include polarimetric radar data, however, then snow may not be distinguishable from rain. A general precipitation intensity type may still be determined, however. For example, 'no precipitation' may be determined for a horizontal reflectivity of less than −30 dBZ, between −30 and 15 dBZ may determine 'light precipitation', between 15 to 40 dBZ may determine 'moderate precipitation', and over 40 dBZ may determine 'heavy precipitation'.

In a second case of a first level of determining precipitation type 118, remote weather data 112 may include satellite cloud classification data. For example, NRL cloud classification data may be received to determine the types 'precipitation' or 'no precipitation'.

In a third case of a first level of determining precipitation type 118, remote weather data 112 may include radar and weather station air temperature data.

If polarimetric radar data is received, the hydrometeor identification may be used to determine the precipitation types 'snow', 'rain', or 'no precipitation'. If the precipitation type 'snow' or 'rain' is determined, the precipitation phase may be checked against the weather station air temperature data. If the weather station air temperature data is less than −5° C., the precipitation type 118 may be changed to 'snow'. If the weather station air temperature data is greater than 5° C., the precipitation type 118 may be changed to 'rain'. If the weather station air temperature data is between −5° C. and 5° C., the precipitation type 118 may remain unchanged. Radar horizontal reflectivity may be further used to determine the intensity of the precipitation type 118. For example, if a precipitation type 'snow' is determined, a horizontal reflectivity of less than 10 dBZ may determine the precipitation type 'light snow', greater than 20 dBZ may determine 'heavy snow', and between 10 and 20 dBZ may determine 'moderate snow'. If the precipitation type 'rain' is determined, however, a horizontal reflectivity of less than 20 dBZ may determine the precipitation type 'light rain', greater than 40 dBZ may determine 'heavy rain', and between 20 and 40 dBZ may determine 'moderate rain'.

If polarimetric data is not available, then the weather station air temperature may be used to determine the precipitation type 'snow' for a temperature of less than −2° C., 'rain' for a temperature that is greater than 2° C., and 'mixed' if the temperature is between −2 and 2° C. For the precipitation type 'snow', a horizontal radar reflectivity of less than 10 dBZ may determine the precipitation type 'light snow', over 20 dBZ may determine 'heavy snow', and between 10 and 20 dBZ may determine 'moderate snow'. For the precipitation types 'rain' or 'mixed', 'light rain' or 'light mixed' may be determined for a radar horizontal reflectivity of than 20 dBZ, and the precipitation types 'heavy rain' or heavy mixed' for a horizontal reflectivity greater than 40 dBZ, and the precipitation types 'moderate rain' or 'moderate mixed' for a horizontal reflectivity between 20 and 40 dBZ.

In a fourth case of a first level of determining precipitation type 118, remote weather data 112 may include satellite cloud classification and weather station air temperature data. The satellite cloud classification may be used to determine the precipitation types 'precipitation' and 'no precipitation'. If the type 'precipitation' is determined, the precipitation type 118 will be changed to 'snow if the weather station air temperature is less than −2° C., to 'rain' if the temperature is greater than 2° C., and to 'mixed' if the temperature is between −2° C. and 2° C.

In a fifth case of a first level of determining precipitation type 118, remote weather data 112 may include radar data, satellite cloud classification data, and weather station air temperature data.

If polarimetric radar data is received, the hydrometeor identification may be used to determine a precipitation type of 'snow', 'rain', or 'no precipitation'. If the precipitation type 'snow' or 'rain' is determined, the precipitation phase may be checked against the weather station air temperature data. If the weather station air temperature data is less than −5° C., the precipitation type 118 may be changed to 'snow'. If the weather station air temperature data is greater than 5° C., the precipitation type 118 may be changed to 'rain'. If the weather station air temperature data is between −5° C. and 5° C., the precipitation type 118 may not be changed, however. Radar horizontal reflectivity may be further used to determine the intensity of the precipitation type 118. For example, if a precipitation type 'snow' is determined, a horizontal reflectivity of less than 10 dBZ may determine the precipitation type 'light snow', greater than 20 dBZ may determine 'heavy snow', and between 10 and 20 dBZ may determine 'moderate snow'. If the precipitation type 'rain' is determined, however, a horizontal reflectivity of less than 20 dBZ may determine the precipitation type 'light rain', greater than 40 dBZ may determine 'heavy rain', and between 20 and 40 dBZ may determine 'moderate rain'.

If no polarimetric data is available, then the weather station air temperature may be used to determine the precipitation type 'snow' for a temperature of less than −2° C., 'rain' for a temperature that is greater than 2° C., and 'mixed' if the temperature is between −2 and 2° C. For the precipitation type 'snow', a horizontal radar reflectivity of less than 10 dBZ may determine the precipitation type 'light snow', over 20 dBZ may determine 'heavy snow', and between 10 and 20 dBZ may determine 'moderate snow'. For the precipitation types 'rain' or 'mixed', 'light rain' or 'light mixed' may be determined for a radar horizontal reflectivity of less than 20 dBZ, and the precipitation types 'heavy rain' or heavy mixed' for a horizontal reflectivity greater than 40 dBZ, and the precipitation types 'moderate rain' or 'moderate mixed' for a horizontal reflectivity between 20 and 40 dBZ. In embodiments, the resulting precipitation type category may be compared to satellite cloud classification data and modified accordingly.

In embodiments, step 204 may further include determining a precipitation type confidence level 119. A confidence level reflects the amount of trust that may be placed in a condition determined in general, and a precipitation type confidence level 119 specifically reflects the trust that may be placed in the determination of precipitation type 118 by the precipitation type module 110 for a segment of road. The precipitation type confidence level 119 may be 'low', 'medium', or 'high'. In an example implementation, the precipitation type confidence level 119 may be determined to be 'medium' if remote weather data 112 includes radar data, and 'low' if remote weather data 112 does not include radar data. In embodiments, the precipitation type confidence level 119 may be used to further determine a road hazard condition 142.

Step 204 provides an initial precipitation type inference using only ancillary, traditional weather observation data. The precipitation type 118 determined in step 204 may be further determined based upon available mobile data, as described below.

Method 200 continues with step 206. In step 206, a road hazard condition for the road segment is determined using the precipitation type. For example, road hazard condition 142 may be determined using precipitation type 118. Road hazard condition 142 is a message, notification, or alert regarding a driving condition directed to an end user, such as a driver. In embodiments, road hazard condition 142 may include information identifying precipitation type 118, in addition to further information, as described below.

Figure 3:
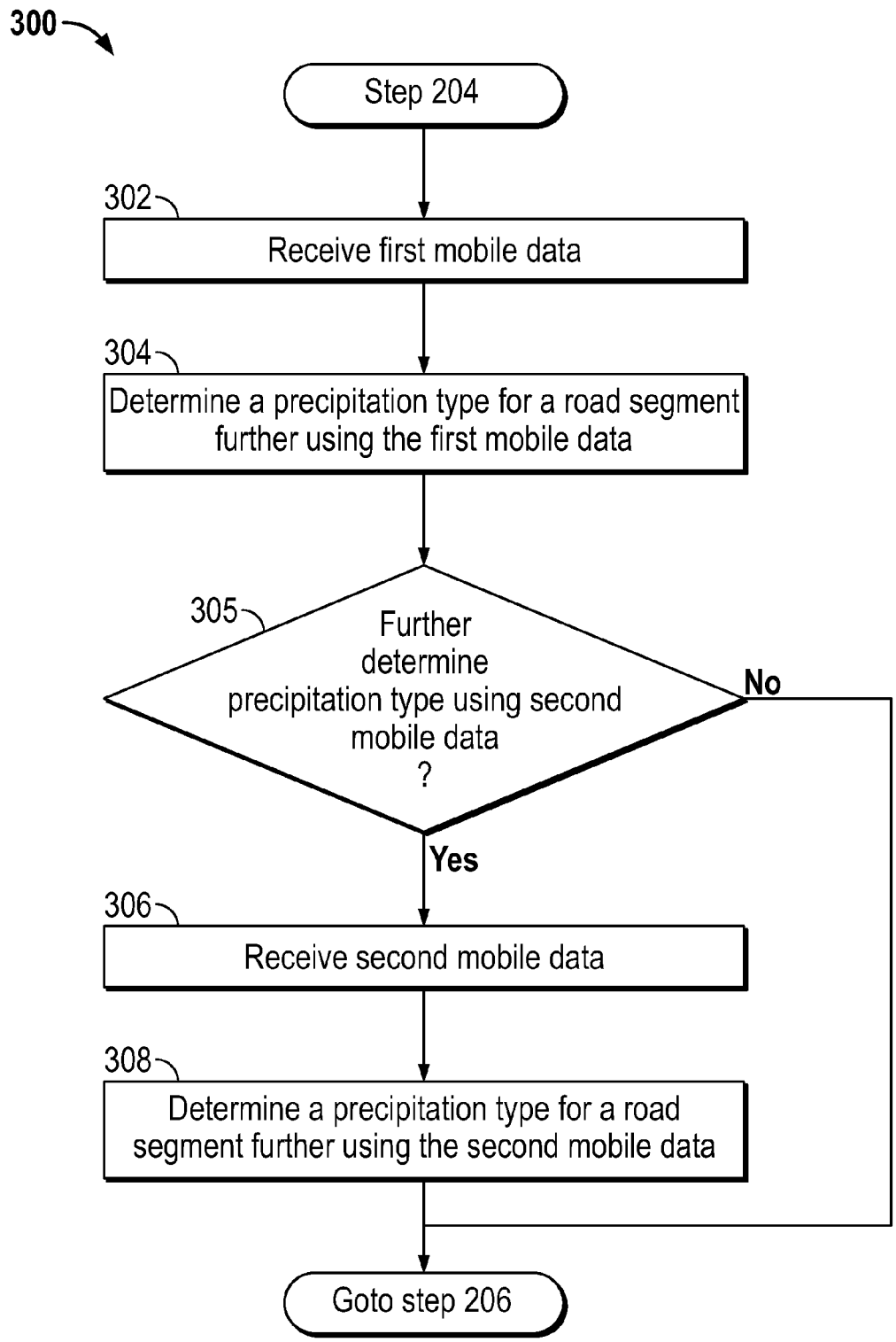
FIG. 3 depicts a method 300 for assessing road conditions, in accordance with an embodiment of the application.

In embodiments, step 204 of method 200 may be performed with additional steps. For example, additional levels of determining precipitation type 118 may incorporate mobile data. Mobile data includes any data received from a mobile source. For example, FIG. 3 depicts method 300. Method 300 begins with step 302, which is performed with, or immediately following step 204. In step 302, a first mobile data is received.

For example, precipitation type module 110 may receive first mobile data 114. First mobile data 114 may include, but is not limited to a wiper status and a mobile air data. A wiper status is any status that may include information about whether a vehicle windshield wiper is operating and the speed of operation. In an example embodiment, the wiper status may include the states 'off', 'intermittent', 'low', or 'high'. A mobile air data is a vehicle-measured ambient air temperature that may be determined using any type of temperature monitoring equipment known to those of skill in the art.

Method 300 continues with step 304. In step 304, a precipitation type is further determined for a road segment using the first mobile data. For example, precipitation type module 110 may further determine the precipitation type 118 using the first mobile data 114. In embodiments, the precipitation type confidence level 119 for the road segment may be further determined using the first mobile data 114.

In a first case of a second level of determining precipitation type 118, the first mobile data 114 may include a mobile air data and remote weather data 112 may include a weather station temperature. The mobile air data may be compared to the weather station air temperature data, and the precipitation type 118 may be further determined in one of the three following ways:

- If the absolute value of the difference between the vehicle and weather station air temperatures has an absolute value that is less than 1° C., no further determination of the precipitation type 118 is made at the second level.
- If the difference between the vehicle and weather station air temperatures has an absolute value that is greater than 1° C. and remote weather data 112 includes polarimetric radar data, the precipitation type 118 may be further determined to be 'snow' if the mobile air data is less than −5° C., 'rain' if greater than 5° C., and not changed if between −5 and 5° C.
- If the absolute value of the difference between the vehicle and weather station air temperatures is greater than 1° C. and remote weather data 112 does not include polarimetric radar data, the precipitation type 118 may be changed to 'snow' if the mobile air data is less than −2° C., 'rain' if the mobile air data is greater than 2° C., and 'mixed' if the mobile air data is between −2 and 2° C.

In a second case of a second level of determining precipitation type 118, the first mobile data 114 may include a mobile air data and remote weather data 112 may not include weather station temperature data. The precipitation type 118 may be further determined in one of the three following ways:

- If remote weather data 112 includes polarimetric radar data, the precipitation type 118 may be further determined using the mobile air data. For example, if the mobile air data is less than −5° C. the precipitation type 118 may be determined to be 'snow', if the mobile air data is greater than 5° C. the precipitation type 118 may be determined to be 'rain', and the precipitation type 118 may not be changed if the mobile air data is between −5 and 5° C. If the precipitation type 118 is determined to be 'snow', then the precipitation type 118 may be further determined to be 'light snow' if the radar horizontal reflectivity is less than 10 dBZ, 'heavy snow' if greater than 20 dBZ, and 'moderate snow' if between 10 and 20 dBZ. If the precipitation type 118 is determined to be 'rain', then the precipitation type 118 may be further determined to be 'light rain' if the reflectivity is less than 20 dBZ, 'heavy rain' if greater than 40 dBZ, and 'moderate rain' if 20 to 40 dBZ. If remote weather data 112 includes satellite cloud classification data, the precipitation type 118 may be further determined based upon the satellite cloud classification data.
- If remote weather data 112 includes no polarimetric radar data or weather station air temperature data, but does include horizontal reflectivity radar data, the precipitation type 118 may be determined to be 'snow' if the mobile air data is less than −2° C., 'rain' if the mobile air data is greater than 2° C., and 'mixed' if the mobile air data is −2 to 2° C. If the precipitation type 118 is determined to be 'snow', the precipitation type 118 may be further determined to be 'light snow' if the radar horizontal reflectivity is less than 10 dBZ, 'heavy snow' if greater than 20 dBZ, and 'moderate snow' if 10 to 20 dBZ. If the precipitation type 118 is determined to be 'mixed' or 'rain', the precipitation type 118 may be further determined to be 'light mixed' or 'light rain if the reflectivity is less than 20 dBZ, 'heavy mixed' or 'heavy snow' if greater than 40 dBZ, and 'moderate mixed' or 'moderate snow' if 20 to 40 dBZ. If remote weather data 112 includes satellite cloud classification data, the precipitation type 118 may be further determined based upon the satellite cloud classification data.

In further embodiment of the second level of determining precipitation type 118, the first mobile data 114 may include wiper status. If the first mobile data 114 includes the wiper status, the precipitation type 118 may be further determined made based on the following wiper status values:

- If wiper status is 'off':
  - 'no precipitation', 'light rain' or 'light snow' are unchanged,
  - 'moderate rain' and 'heavy rain' changed to 'light rain',
  - 'moderate snow' changed to 'light snow',
  - 'heavy snow' is changed to 'moderate snow',
  - 'rain' changed to 'light rain',
  - 'snow' changed to 'light snow',
  - 'mixed' changed to 'light mixed',
  - 'precipitation' changed to 'light precipitation'.
- If wiper status is 'intermittent':
  - 'light' or 'moderate' precipitation of any type are unchanged,
  - 'no precipitation' is changed to 'road splash'
  - 'heavy' precipitation of any type is changed to 'moderate'
  - 'rain' changed to 'light rain',
  - 'snow' changed to 'light snow',
  - 'mixed' changed to 'light mixed', and
  - 'precipitation' changed to 'light precipitation.
- If wiper status is 'low':
  - 'moderate' or 'heavy' precipitation of any type are unchanged,
  - 'no precipitation' is changed to 'road splash',
  - 'light' precipitation of any type is changed to 'moderate',
  - 'rain' changed to 'moderate rain',
  - 'snow' changed to 'moderate snow',
  - 'mixed' changed to 'moderate mixed', and
  - 'precipitation' changed to 'moderate precipitation.
- If wiper status is 'high':
  - 'moderate rain', 'heavy rain' and 'heavy snow' are unchanged,
  - 'no precipitation' is changed to 'road splash',
  - 'light' precipitation of any type is changed to 'moderate',
  - 'moderate snow' is changed to 'heavy snow'
  - 'rain' changed to 'heavy rain',
  - 'snow' changed to 'heavy snow',
  - 'mixed' changed to 'heavy mixed', and
  - 'precipitation' changed to 'heavy precipitation.

In an embodiment, the precipitation type confidence level 119 may be further determined at the second level based on the first mobile data 114:

- The precipitation type confidence level 119 may be changed to be 'low' if the precipitation type 118 is 'no precipitation', 'rain', 'snow', or 'mixed'.
- The precipitation type confidence level 119 may be changed to 'medium' if the first mobile data 114 fails to include a wiper status or a mobile air data.
- The precipitation type confidence level may be changed to 'high' if the precipitation type 118 includes a type ('rain', 'snow', or 'mixed') and an intensity ('light', 'moderate', or 'heavy') and the first mobile data 114 includes both a wiper status and a mobile air data.

Method 300 continues with step 305. In step 305, it is determined whether the precipitation type 118 will be further determined using second mobile data. If it is determined that precipitation type will be further determined using second mobile data 116, method 300 may continue to step 306. If it is determined that precipitation type will not be further determined using second mobile data 116, however, then method 300 may end and method 200 may continue with step 206.

In embodiments, steps 306 and 308 may represent a third level of determining precipitation type 118. In step 306, a second mobile data is received. For example, second mobile data 116 may include, but is not limited to, at least one of a speed ratio and a headlight status. A speed ratio may be determined by calculating the ratio of the vehicle speeds on the segment to the posted speed limit for that segment. A headlight status may include an indicator of whether the headlights are 'off' or 'on'.

In step 308, the precipitation type 118 is further determined using the second mobile data 116.

In a first case of a third level of determining precipitation type 118, the second mobile data 116 may include a speed ratio. If speed ratio is present, then the precipitation type 118 may be further determined as follows:
  If the speed ratio is greater than 0.7, the precipitation type 118 'heavy snow' is changed to 'moderate snow',
  If the speed ratio is greater than 0.8, the precipitation type 118 'heavy rain' is changed to 'moderate rain'.

In a second case of a third level of determining precipitation type 118, the second mobile data 116 may include a headlight status. If headlight status is present, then the precipitation type 118 may be further determined as follows:
  If the current time falls into a nighttime range, no precipitation type 118 change is made.
  If the headlight status is 'off', a 'moderate' precipitation type 118 is changed to a 'light' precipitation type 118 and a 'heavy' precipitation is changed to a 'moderate' precipitation type 118.

In an embodiment, the precipitation type confidence level 119 may be further determined at the third level based on the further determination of precipitation type using second mobile data 116. For example, the precipitation type confidence level 119 at a third level may be determined to be 'high'.

After step 308 has been performed, method 300 may conclude, and method 200 may continue with step 206, as described above.

Figure 4:
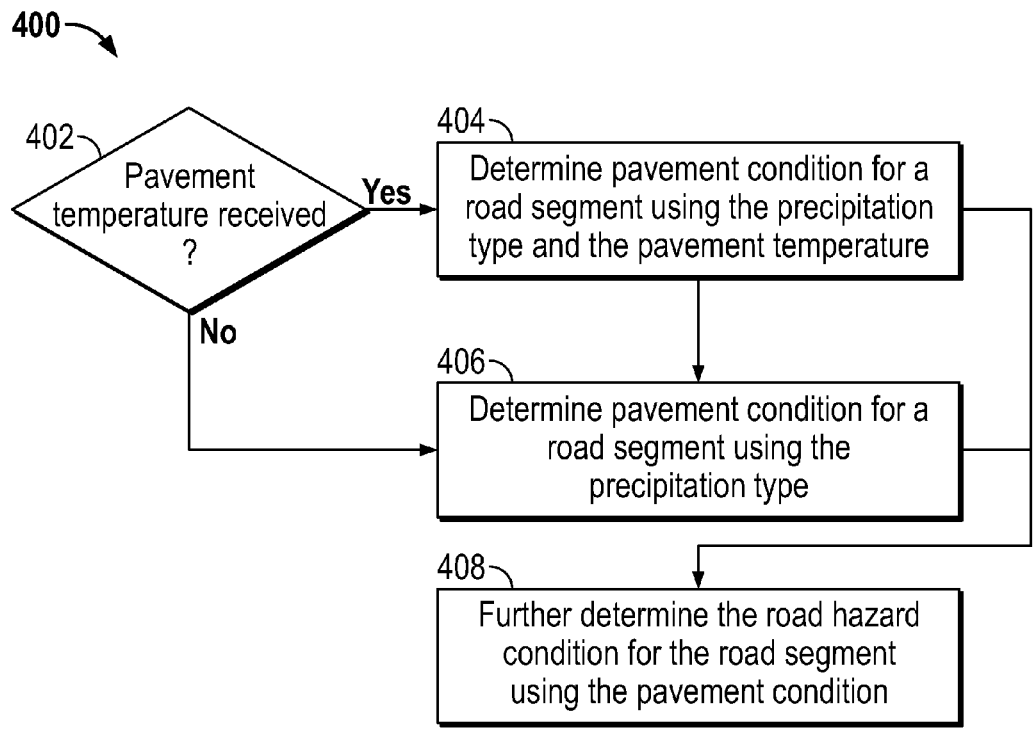
FIG. 4 depicts a method 400 for assessing road conditions, in accordance with an embodiment of the application.

FIG. 4 depicts an example embodiment of pavement condition module 120 in accordance with an embodiment. Method 400 begins with step 402. In step 402, it is determined whether a pavement temperature has been received. For example, pavement condition module 120 may receive pavement temperature 122. Pavement temperature 122 may be determined via a mobile source or via a surface weather station, etc.

If pavement temperature 122 is received in step 402, method 400 continues with step 404. In step 404, a pavement condition is determined using the precipitation type and the pavement temperature. A pavement condition describes the condition of a road segment. In embodiments, a pavement condition may be determined to be 'dry', 'snow', 'ice', 'wet', 'dry/snow/ice', or 'dry/wet'. In an example embodiment, the pavement condition may be determined in step 404 as follows:
  If the pavement temperature is less than −2° C.:
    if precipitation type 118 is 'no precipitation', the pavement condition is determined to be 'dry',
    if the precipitation type 118 is 'precipitation', 'snow', or 'road splash', the pavement condition is determined to be 'snow', and
    if the precipitation type 118 is 'mixed', 'rain', the pavement condition is determined to be 'ice'.
  If the pavement temperature is greater than −2° C.:
    if the precipitation type 118 is 'no precipitation', the pavement condition is determined to be 'dry', and
    if the precipitation type 118 is any type besides 'no precipitation', the pavement condition is determined to be 'wet'.

If pavement temperature 122 is not received in step 402, method 400 continues with step 406. In step 406, a pavement condition is determined using the precipitation type 118 as follows:
  If the precipitation type 118 is 'no precipitation' the pavement condition is determined to be 'dry'.
  If the precipitation type 118 is 'rain' or 'road splash', the pavement condition is determined to be to 'wet'.
  If the precipitation type 118 is 'snow' or 'mixed', the pavement condition is determined to be 'snow'.

Method 400 continues after steps 404 or 406 with step 408. In step 408, the road hazard condition for the road segment is further determined using pavement condition 126.

Figure 5:
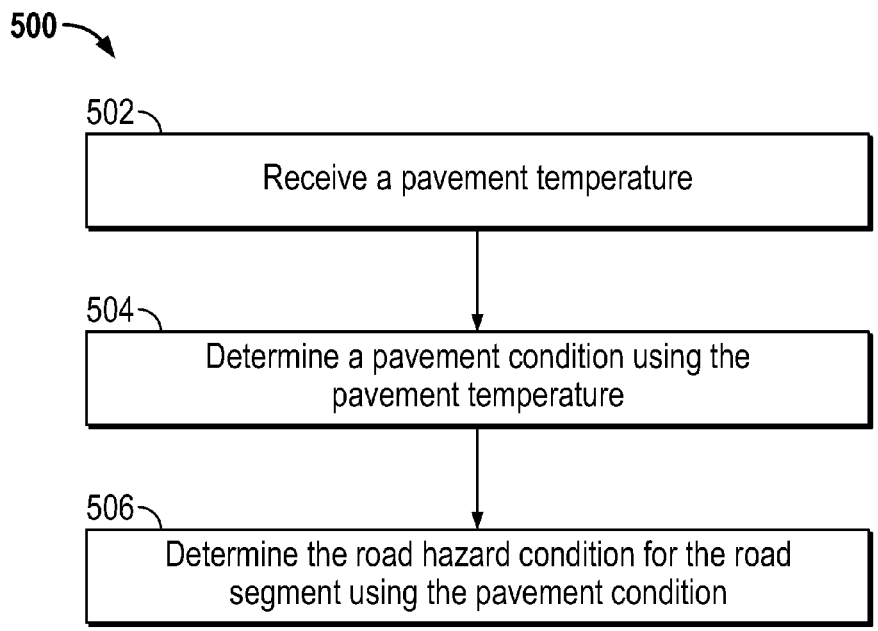
FIG. 5 depicts a method 500 for assessing road conditions, in accordance with an embodiment of the application.

FIG. 5 depicts a further example embodiment of pavement condition module 120. Method 500 is similar to method 400, except method 500 determines a pavement condition and/or a road hazard condition without using precipitation type 118.

Method 500 begins with step 502. In step 502, a pavement temperature is received.

Method 500 continues with step 504. In step 504, a pavement condition is determined using the pavement temperature. In an example embodiment, the pavement condition 126 may be determined in step 504 as follows:
  If the pavement temperature is less than −2° C., the pavement condition is determined to be 'dry/snow/ice'.
  If the pavement temperature is determined to be greater than −2° C., the pavement condition is determined to be 'dry/wet'.

Method 500 continues with step 506. In step 506, the road hazard condition for the road segment is further determined using pavement condition 126.

Figure 6:
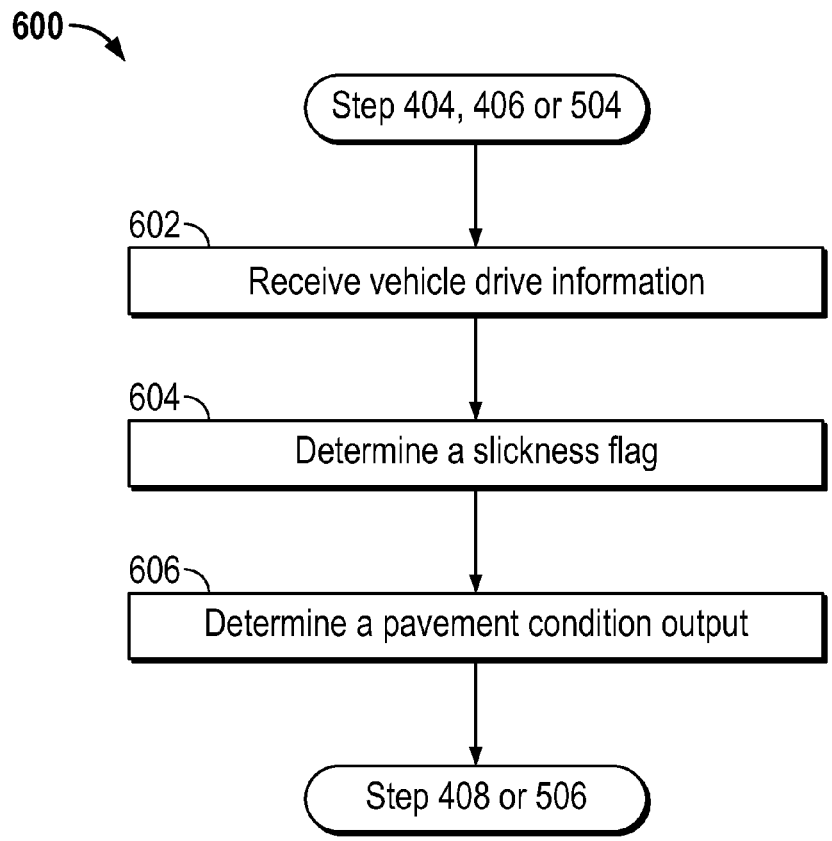
FIG. 6 depicts a method 600 for assessing road conditions, in accordance with an embodiment of the application.

In embodiments, methods 400 or 500 may include steps additional to, or immediately following any of steps 404, 406, or 504. For example, FIG. 6 depicts method 600. Method 600 begins with step 602. In step 602, vehicle drive information is received. Vehicle drive information may include, but is not limited to: an automatic brake system (ABS) status, a traction status or a stability control observation, or a yaw rate. The traction status and the stability control observation indicate whether a vehicle is 'engaged' or 'not engaged'.

Method 600 continues with step 604. In step 604, a slickness flag is determined using the vehicle drive information. A slickness flag indicates that pavement conditions are slick, or that traction may otherwise be diminished for a road segment. In an example embodiment, the slickness interest level, slick_int, may be determined. An interest value is a value between 0 and 1 in fuzzy logic that represents the possibility that a respective condition is present. For example the possibility of slick pavement conditions, slick_int, may be estimated using on the following fuzzy logic:

$$\text{slick\_int} = 0.3*p + 0.3*r + 0.2*s + 0.1*i + 0.1*d \quad (\text{Eqn 1})$$

where:

$$p = \begin{cases} -1 & \text{if precipitation type is no precipitation} \\ -0.5 & \text{if precipitation type is light rain, moderate rain, or road splash} \\ 0 & \text{if precipitation type is heavy rain} \\ 0.5 & \text{if precipitation type is light snow, moderate snow, mixed} \\ 1 & \text{if precipitation type is heavy snow} \end{cases}$$

-continued $$r = \begin{cases} -1 & \text{if pavement condition is dry pavement} \\ 0 & \text{if pavement condition is wet or wet/dry pavement} \\ 0.5 & \text{if pavement condition is dry/snow/ice pavement} \\ 1 & \text{if pavement condition is snow/ice} \end{cases}$$

$$s = \begin{cases} 0 & \text{if ABS, traction control, and stability control all not activated} \\ 1 & \text{if ABS, traction control, or stability control is activated} \end{cases}$$

$$i = \begin{cases} IQR(\text{yaw rate}) & \text{if } IQR(\text{yaw rate}) \leq 1 \\ 1 & \text{if } IQR(\text{yaw rate}) > 1 \end{cases}$$

$$d = \begin{cases} \max(\text{yaw rate} - \text{median}(\text{yaw rate})) \\ \quad \text{if } \max(\text{yaw rate} - \text{median}(\text{yaw rate})) \leq 1 \\ 1 \\ \quad \text{if } \max(\text{yaw rate} - \text{median}(\text{yaw rate})) > 1 \end{cases}$$

If slick_int is greater than or equal to 0.44, then the slickness flag 128 is set to true. In further embodiments, the slickness flag 128 may be included with a pavement condition 126 based on whether the pavement condition 126 is determined to be 'wet', 'snow', 'ice' or any combination thereof.

Method 600 continues with step 606. In step 606, a pavement condition output is determined using the pavement condition and the slickness flag. The pavement condition output 129 may be used to indicate the condition of the road segment in a user-friendly format that incorporates both pavement condition 126 and slickness flag 128. In an example embodiment, the pavement condition output 129 may be determined based on the following rules:

if pavement condition is 'dry/wet', pavement condition output is 'not icy',
if pavement condition is 'dry/wet' and slickness flag, pavement condition output is 'wet'
if pavement condition is 'dry/snow/ice', pavement condition output is 'ice possible'
if pavement condition is 'dry/snow/ice' and slickness flag, pavement condition output is 'icy'
if pavement condition is 'dry', pavement condition output is 'dry'
if pavement condition is 'wet', pavement condition output is 'wet'
if pavement condition is 'wet' and slickness flag, pavement condition output is 'wet, hydroplaning possible'
if pavement condition is 'snow', pavement condition output is 'snow'
if pavement condition is 'snow' and slickness flag, pavement condition output is 'slick, snowy'
if pavement condition is 'ice', pavement condition output is 'icy'
if pavement condition is 'ice' and slickness flag, pavement condition output is 'slick, icy'

The rules for determining pavement condition output 129 described above are not intended to be limiting. Other rules and inputs are also possible, as will be understood by those who are skilled in the art.

In embodiments, methods 400, 500, or 600 may further include determining a pavement condition confidence level 127 using pavement temperature 122 and the precipitation type 118. A pavement condition confidence level 127 reflects the level of trust that may be placed in any combination of a pavement condition 126, a slickness flag 128, or a pavement condition output 129. In an example embodiment, the pavement condition confidence level 127 may be determined based on the following rules:

if a pavement temperature is received but no precipitation type 118 is available, or the precipitation type 118 confidence level is 'low', the pavement condition confidence level 127 is 'low'
if no pavement temperature is received but precipitation type 118 is available, or the precipitation type 118 confidence level is 'medium, the pavement condition confidence level 127 is 'medium'
if a pavement temperature is received and precipitation type 118 is available, the pavement condition confidence level 127 is 'high
if there is a slickness flag and the vehicle drive information does not include automatic brake system status, traction status, or stability control status, the pavement condition level is set to 'medium'.

The rules for determining the pavement condition confidence level 127 described above are not intended to be limiting. Other rules and inputs are also possible, as will be understood by those of skill in the art.

Figure 7:
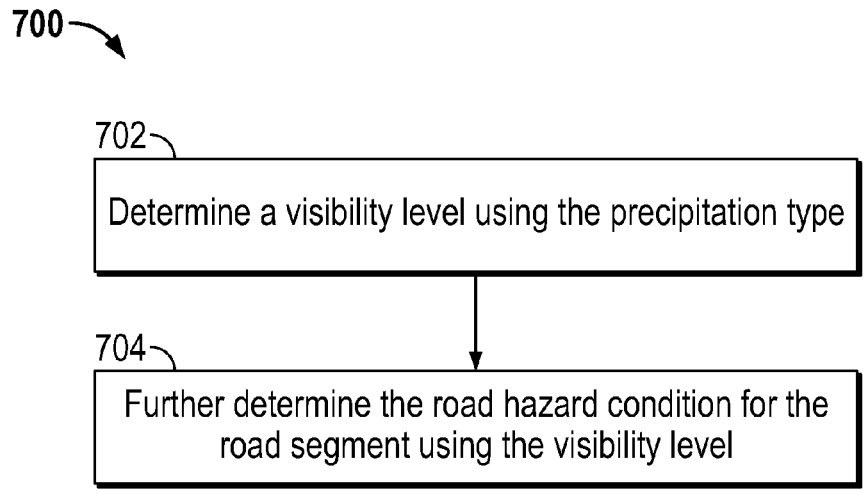
FIG. 7 depicts a method 700 for assessing road conditions, in accordance with an embodiment of the application.

FIG. 7 depicts method 700, an example embodiment of a visibility level module 130. Method 700 begins with step 702. In step 702, a visibility level for a road segment is determined using the precipitation type. A visibility level describes the clarity with which a motorist may expect to see through the outside air while operating a vehicle on the road segment.

In an example embodiment, if the precipitation type 118 is 'heavy rain', with a 'medium' or 'high' precipitation type confidence level 119, the visibility level 138 may be determined to be 'heavy rain'. If the precipitation type 118 is 'heavy snow, with a 'medium' or 'high' precipitation type 118 confidence level, the visibility level 138 may be determined to be 'heavy snow.

Method 700 continues with step 704. In step 704, the road hazard condition for the road segment is further determined using the visibility level 138.

Figure 8:
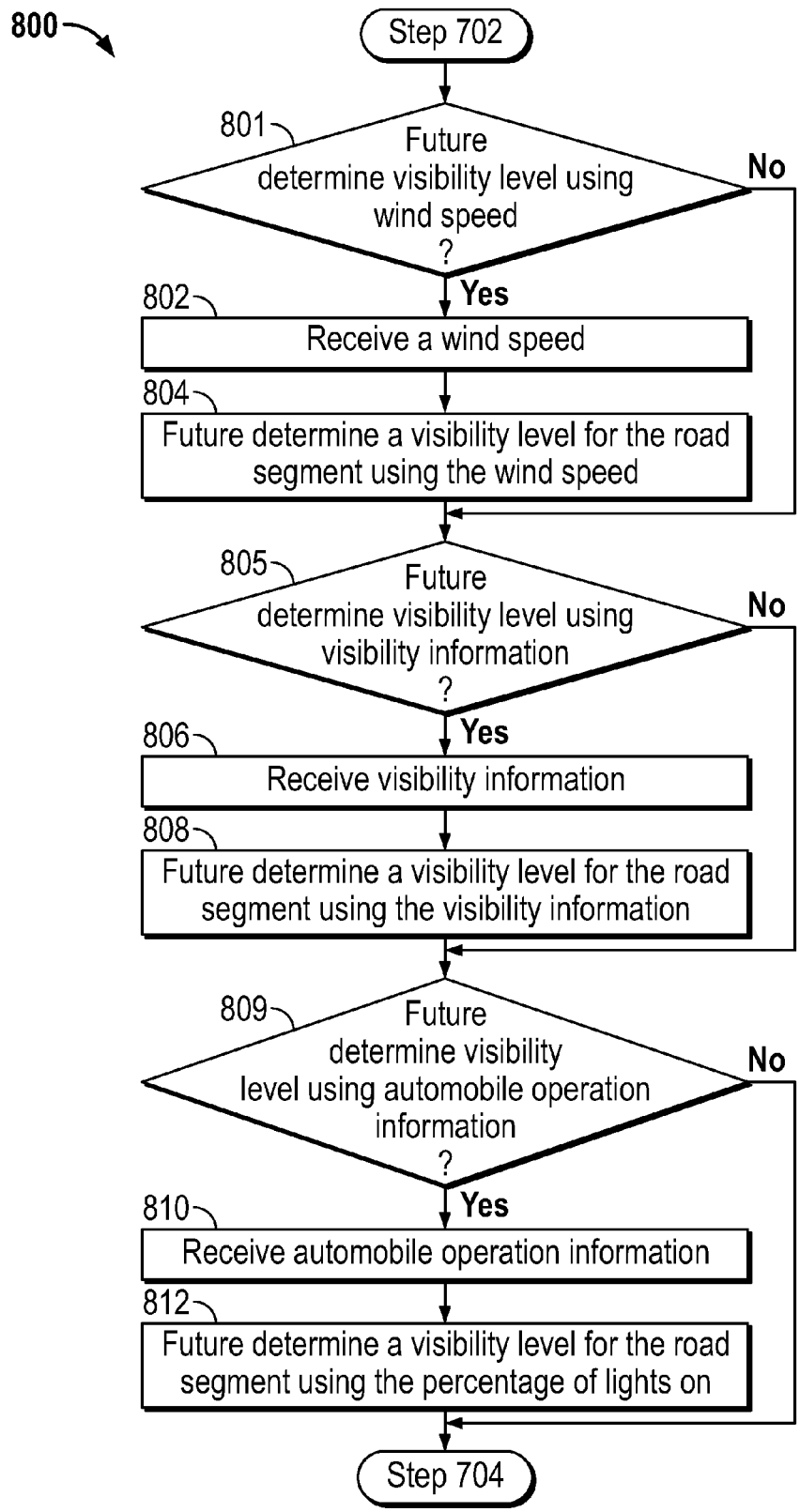
FIG. 8 depicts a method 800 for assessing road conditions, in accordance with an embodiment of the application.

In embodiments, method 700 may include steps additional to, or immediately following step 702 to further determine the visibility level. For example, FIG. 8 depicts method 800. Method 800 begins with step 801. In step 801, it is determined whether visibility level will be further determined using a wind speed. If visibility level will be further determined using a wind speed, step 801 continues with step 802. If visibility level will not be further determined using a wind speed, however, step 801 continues with step 805.

If a wind speed is determined to be available in step 801, method 800 continues with step 802. In step 802, a wind speed is received. In embodiments, the wind speed may be received from any type of weather instrument commonly known to those of skill in the art, including a mobile, surface, or remote weather instrument.

Method 800 continues with step 804. In step 804, the visibility level is further determined using the wind speed. In an example embodiment, if the wind speed 132 is over a threshold level and the precipitation type 118 is any intensity of 'snow', the visibility level 138 may be determined to be 'blowing snow'. If the wind speed 132 is over a threshold level and the pavement condition includes 'snow', the visibility level 138 may also be determined to be 'blowing snow'.

Method 800 continues with step 805. If visibility level will be further determined using visibility information, step 805 continues with step 806. If visibility level will not be further determined using visibility information, step 805 continues with step 809. In embodiments, visibility level will only be further determined using visibility information if visibility level 138 does not include 'blowing snow', 'heavy snow' or 'heavy rain' after step 804. In other embodiments, visibility level will only be further determined using visibility information regardless of the visibility level 138 determined in step 804, however.

Method 800 continues with step 806. In step 806, visibility information is received. For example, visibility level module 130 may receive visibility information 134. Visibility information 134 includes information or data that may be used to determine the visibility conditions on a road segment. For example, the visibility information 134 may include, but is not limited to: a relative humidity, a percentage of fog lights on, a percentage of high beams on, a speed ratio, a station visibility, a station-reported visibility type, a wildfire existence indicator, a wind direction, and a dust existence indicator, etc. Relative humidity may be determined using any type of algorithm and weather instrument commonly known to those of skill in the art. In an example embodiment, the relative humidity may be received from a vehicle information source. If no vehicle humidity information is available, the relative humidity may be calculated using the mobile air data and the nearest weather station dewpoint temperature. Alternatively, if no mobile air data is available, the relative humidity may be determined using the nearest weather station relative humidity measurement. The percentage of fog lights on indicates the percentage of fog lights of the total number of available fog lights on a vehicle that are powered on. The percentage of high beams indicates the percentage of high beam headlights of the total number of available high beam headlights on a vehicle that are powered on. The station visibility represents a distance that may be seen from a weather station. The station-reported visibility type may include 'fog', 'haze', 'dust', or 'smoke'. The wildfire existence indicator determines whether there is a wildfire within a threshold distance of a road segment. The dust existence indicator indicates whether dusty areas exist within a threshold distance of a road segment. In embodiments, the dust existence indicator may be determined using information about landscape and historical record of precipitation in an area.

Method 800 continues with step 808. In step 808, the visibility level is further determined using visibility information 134. In an embodiment, visibility level module 130 may determine whether a visibility hazard that includes fog, haze, smoke, and dust, in addition to other possible visibility hazards, may further determine the visibility level 138. For example, a visibility hazard may be determined using fuzzy logic with the following equation:

$$\text{hazard} = \max(\text{fog\_int}, \text{haze\_int}, \text{smoke\_int}, \text{dust\_int}) \quad \text{(Eqn 2)}$$

if hazard >0.4, output hazard where fog_int is an interest value for fog, haze_int is an interest value for haze, smoke_int is an interest value for smoke, and dust_int is an interest value for dust. The maximum interest value for each of fog_int, haze_int, smoke_int, and dust_int is returned by Equation 2. If the maximum interest value is greater than 0.4, then a further visibility hazard has been identified. If all interest values are less than or equal to 0.4, then no visibility hazard is identified. The interest value for each visibility hazard type may be determined as described below.

The fog interest value may be calculated as follows:

$$\text{fog\_int} = 0.4 * r + 0.2 * f - 0.2 * h + 0.2 * s + 0.1 * v + 0.1 * t$$

where:

Relative humidity = $x$ $$r = \begin{cases} -1 & \text{if } x < 40 \\ (x/20) - 3 & \text{if } 40 \leq x \leq 60 \\ 0 & \text{if } 60 < x \leq 80 \\ (x/20) - 20 & \text{if } 80 < x \leq 100 \\ 1 & \text{if } x > 100 \end{cases}$$

Percent of fog lights on = $x$ $$f = \{x/100 \text{ if } 0 \leq x \leq 100$$

Percent of high beams on = $x$ $$h = \{x/100 \text{ if } 0 \leq x \leq 100$$

Speed ratio = $x$ $$s = \begin{cases} 5x & \text{if } x < 0.2 \\ (-2x/3) + 17/15 & \text{if } 0.2 \leq x \leq 0.5 \\ (-8x/5) + 8/5 & \text{if } 0.5 < x \leq 1 \\ 0 & \text{if } x > 1 \end{cases}$$

Station visability = $x$ $$v = \begin{cases} (-x/10) + 1 & \text{if } 0 \leq x \leq 10 \\ 0 & \text{if } x > 10 \end{cases}$$

Station-reported visibility type = $x$ $$t = \begin{cases} 1 & \text{if } x = \text{fog} \\ 0 & \text{if } x \neq \text{fog} \end{cases}$$

The haze interest value may be calculated as follows:

$$\text{haze\_int} = 0.6 * r + 0.2 * v + 0.2 * t$$

where:

Relative humidity = $x$ $$r = \begin{cases} (x/40) - 1 & \text{if } x < 40 \\ 0 & \text{if } 40 \leq x \leq 60 \\ (x/20) - 3 & \text{if } 60 < x \leq 80 \\ (-x/20) + 5 & \text{if } 80 < x \leq 100 \\ 0 & \text{if } x > 100 \end{cases}$$

Station visability = $x$ $$v = \begin{cases} (x/5) & \text{if } 0 \leq x \leq 5 \\ (-x/5) + 2 & \text{if } 5 < x \leq 10 \\ 0 & \text{if } x > 10 \end{cases}$$

Station-reported visibility type = $x$ $$t = \begin{cases} 1 & \text{if } x = \text{haze} \\ 0 & \text{if } x \neq \text{haze} \end{cases}$$

The smoke interest value may be calculated as follows:

$$\text{smoke\_int} = 0.4 * e + 0.3 * w + 0.1 * s + 0.1 * v + 0.1 * t$$

where:

Wildfire existence = $x$ $$e = \begin{cases} 1 & \text{if wildfire exists within } n \text{ km of road segment} \\ 0 & \text{if no wildfire exists within } n \text{ km of road segment} \end{cases}$$

Wind direction = $x$ $$w = \begin{cases} 1 & \text{if segment is downwind of fire location} \\ 0 & \text{if segment is not downwind of fire location} \end{cases}$$

Speed ratio = $x$ $$s = \begin{cases} 5x & \text{if } x < 0.2 \\ (-2x/3) + 17/15 & \text{if } 0.2 \leq x \leq 0.5 \\ (-8x/5) + 8/5 & \text{if } 0.5 < x \leq 1 \\ 0 & \text{if } x > 1 \end{cases}$$

Station visability = $x$

-continued $$v = \begin{cases} (-x/10) + 1 & \text{if } 0 \leq x \leq 10 \\ 0 & \text{if } x > 10 \end{cases}$$

Station-reported visibility type $= x$ $$t = \begin{cases} 1 & \text{if } x = \text{smoke} \\ 0 & \text{if } x \neq \text{smoke} \end{cases}$$

The dust interest value may be calculated as follows:

$$\text{dust\_int} = 0.3 * e + 0.3 * w + 0.2 * s + 0.1 * v + 0.1 * t$$

Dust existence $= x$ $$e = \begin{cases} 1 & \text{if dusty area exists within } n \text{ km of road segment} \\ 0 & \text{if no dusty area exists within } n \text{ km of road segment} \end{cases}$$

Wind speed(kph) $= x$ $$w = \begin{cases} 0 & \text{if } x < 30 \\ (x/30) - 1 & \text{if } 30 \leq x \leq 60 \\ 1 & \text{if } x > 60 \end{cases}$$

Speed ratio $= x$ $$s = \begin{cases} 5x & \text{if } x < 0.2 \\ (-2x/3) + 17/15 & \text{if } 0.2 \leq x \leq 0.5 \\ (-8x/5) + 8/5 & \text{if } 0.5 < x \leq 1 \\ 0 & \text{if } x > 1 \end{cases}$$

Station visability $= x$ $$v = \begin{cases} (-x/10) + 1 & \text{if } 0 \leq x \leq 10 \\ 0 & \text{if } x > 10 \end{cases}$$

Station-reported visibility type $= x$ $$t = \begin{cases} 1 & \text{if } x = \text{dust} \\ 0 & \text{if } x \neq \text{dust} \end{cases}$$

If a further visibility hazard is identified, visibility level 138 may further include 'fog', 'haze', 'dust', or 'smoke', as identified by Equation 2.

Method 700 and steps 802, 804, 806, and 808 may determine whether visibility level 138 includes 'heavy rain', 'heavy snow', 'blowing snow', 'fog', 'haze', 'smoke', or 'dust'. Method 800 continues with step 809. In step 809, it is determined whether visibility level will be further determined using automobile operation information. If visibility level will be further determined using automobile operation information, step 809 continues with step 810. If visibility level will not be further determined using automobile operation information, however, method 800 terminates and method 700 continues with step 704. In embodiments, visibility level may only be further determined using automobile operation information if visibility level 138 does not include 'blowing snow', 'heavy snow', 'heavy rain', 'fog', 'haze', 'smoke', or 'dust' after step 808. In other embodiments, visibility level may be further determined using automobile operation information regardless of the visibility level 138, however.

Method 800 continues with step 810. In step 810, automobile operation information is received. For example, visibility level module 130 may receive automobile operation information 136. The automobile operation information 136 includes information about how an automobile is being operated on the road segment. For example, automobile operation information 136 may include, but is not limited to: a speed ratio, a percentage of lights on, a percentage of fog lights on, and a percentage of high beams on.

In step 812, a visibility level is further determined using the automobile operation information. Specifically, automobile operation information 136 may be used to determine if a low visibility hazard may be inferred to further determine visibility level 138. In an embodiment, fuzzy logic may be applied to determine a low visibility interest value low_vis using the following equation:

$$\text{low\_vis} = 0.3 * r + 0.25 * s + 0.25 * l + 0.2 * v$$

where:

Relative humidity $= x$ $$r = \begin{cases} (x/40) - 1 & \text{if } 0 \leq x < 40 \\ 0 & \text{if } 40 \leq x \leq 60 \\ (x/40) - 3/2 & \text{if } 60 < x \leq 100 \\ 1 & \text{if } x > 100 \end{cases}$$

Speed ratio $= x$ $$s = \begin{cases} 5x & \text{if } x < 0.2 \\ (-2x/3) + 17/15 & \text{if } 0.2 \leq x \leq 0.5 \\ (-8x/5) + 8/5 & \text{if } 0.5 < x \leq 1 \\ 0 & \text{if } x > 1 \end{cases}$$

$$l = 0.375 * o + 0.625 * f - 0.125 * h$$

where:

Percent of lights on $= x$ $o = (x/100)$ if $0 \leq x \leq 100$

Percent of fog lights on $= x$ $f = (x/100)$ if $0 \leq x \leq 100$

Percent of high beams on $= x$ $h = (x/100)$ if $0 \leq x \leq 100$

Station visability $= x$ $$v = \begin{cases} (-x/10) + 1 & \text{if } 0 \leq x \leq 10 \\ 0 & \text{if } x > 10 \end{cases}$$

If the resulting low_vis value is greater than 0.5, then visibility level 138 may further include 'low visibility'. Otherwise, if no visibility hazards have been identified in method 600 or 700, then the visibility level may be determined to be 'normal visibility'. After method 800 concludes with step 812, method 700 may continue with step 704.

In embodiments, a visibility confidence level 139 may be determined. The visibility confidence level 139 for the road segment reflects the level of trust that may be placed in the visibility level 138. The visibility confidence level 139 may be determined based on the amount of input data provided in determining the visibility level 138 and the precipitation type 118 confidence level. For example, the visibility confidence level 139 may be determined based upon how many data points were provided, including the wind speed 132, the visibility information 134, and the automobile operation information 136, and whether the precipitation type confidence level 119 was determined to be 'low', 'medium', or 'high'.

In system 100, it may be seen that road hazard module 140 may determine the road hazard condition 142 based on precipitation type 118, pavement condition 126, slickness flag 128, pavement condition output 129, and/or visibility level 138. In an embodiment, road hazard module 140 may determine road hazard condition 142 by aggregating the information provided by any combination of: precipitation type 118, pavement condition 126, slickness flag 128, pavement condition output 129, and/or visibility level 138. In a further embodiment, road hazard module 140 may determine road hazard condition 142 via a combined algorithm test that outputs the worst driving limitation determined among each of the precipitation type 118, pavement condition 126, or visibility level 138.

In embodiments, any of precipitation type module 110, pavement condition module 120, visibility level module 130, or road hazard module 140 may be integrated into any end-user type device to display road hazard information for an end user. For example, precipitation type module 110, pavement condition module 120, visibility level module 130, or road hazard module 140 may be integrated into web services or in-car delivery systems. Precipitation type module 110, pavement condition module 120, visibility level module 130, or road hazard module 140 may be combined with other navigation systems for smart-routing applications.

In an embodiment, system 100 or any of methods 200, 300, 400, 500, 600, 700, or 800 may be performed frequently at a high resolution using the most up to date and objective information available, providing a more accurate and timely assessment of road hazards and conditions. For example, any of methods 200, 300, 400, 500, 600, 700, or 800 may be performed every five minutes along one-mile segments of roadways.

The system for assessing road conditions described in the application provides the advantage of combining multiple inputs from multiple sources to determine road weather hazard conditions with a high level of certainty. The example logic provided in the application may determine road hazard conditions using decision trees and fuzzy logic weights that function to produce complex yet physically-relevant inferences of weather conditions along the roadway. Methods 200, 300, 400, 500, 600, 700, or 800 present logic that has its basis in a physical understanding of atmospheric processes, in addition to computational intelligence.

Figure 9:
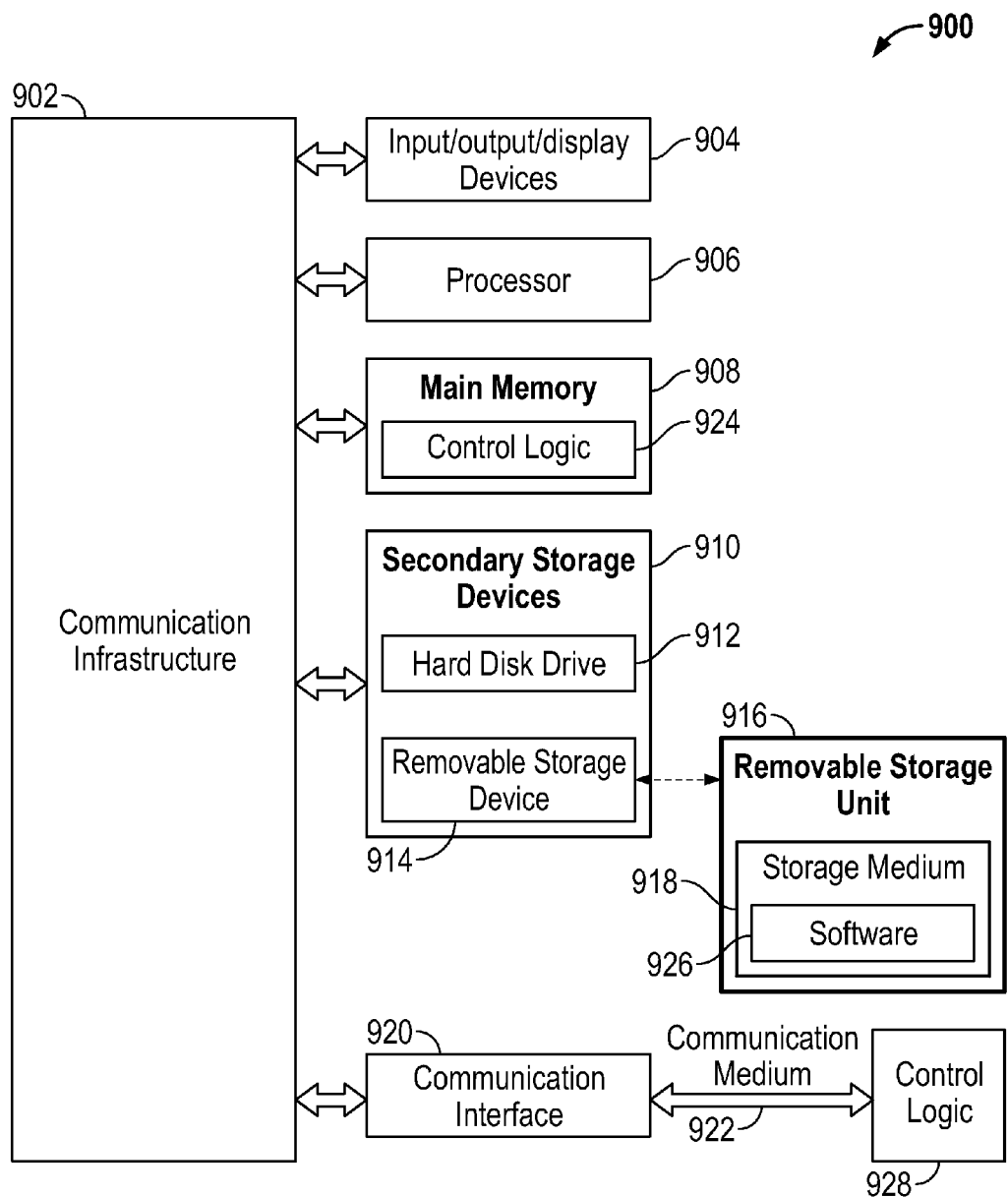
FIG. 9 depicts a block diagram of an example computer system 900 in which embodiments of the present application may be implemented.

FIG. 9 depicts a block diagram of an example computer system 900 in which embodiments of the present application may be implemented. The embodiments described herein, including systems, methods/processes, and/or apparatuses, may be implemented using well known servers/computers, such as computer 900 shown in FIG. 8.

Computer 900 can be any commercially available and well known computer capable of performing the functions described herein, such as computers available from International Business Machines, Apple, Sun, HP, Dell, Cray, etc. Computer 500 may be any type of computer, including a desktop computer, a server, a tablet computer, a a smart phone, etc.

As shown in FIG. 9, computer 900 includes one or more processors (e.g., central processing units (CPUs)), such as processor 906. Processor 906 may perform any of the functions or steps described regarding FIGS. 1-8 in methods 200, 300, 400, 500, 600, 700, or 800 or any other calculation, estimation, or numerical method described in this application herein. Processor 906 is connected to a communication infrastructure 902, such as a communication bus. In some embodiments, processor 906 can simultaneously operate multiple computing threads.

Computer 900 also includes a primary or main memory 908, such as a random access memory (RAM). Main memory has stored therein control logic 924 (computer software), and data.

Computer 900 also includes one or more secondary storage devices 910. Secondary storage devices 910 include, for example, a hard disk drive 912 and/or a removable storage device or drive 914, as well as other types of storage devices, such as memory cards and memory sticks. For instance, computer 900 may include an industry standard interface, such as a universal serial bus (USB) interface for interfacing with devices such as a memory stick. Removable storage drive 914 represents a floppy disk drive, a magnetic tape drive, a compact disk drive, an optical storage device, tape backup, etc.

Removable storage drive 914 interacts with a removable storage unit 516. Removable storage unit 916 includes a computer useable or readable storage medium 518 having stored therein computer software 926 (control logic) and/or data. Removable storage unit 916 represents a floppy disk, magnetic tape, compact disc (CD), digital versatile disc (DVD), Blue-ray disc, optical storage disk, memory stick, memory card, or any other computer data storage device. Removable storage drive 914 reads from and/or writes to removable storage unit 916 in a well-known manner.

Computer 900 also includes input/output/display devices 904, such as monitors, keyboards, pointing devices, etc.

Computer 900 further includes a communication or network interface 920. Communication interface 920 enables computer 900 to communicate with remote devices. For example, communication interface 920 allows computer 900 to communicate over communication networks or mediums 922 (representing a form of a computer useable or readable medium), such as local area networks (LANs), wide area networks (WANs), the Internet, etc. Network interface 920 may interface with remote sites or networks via wired or wireless connections. Examples of communication interface 922 include but are not limited to a modem, a network interface card (e.g., an Ethernet card), a communication port, a Personal Computer Memory Card International Association (PCMCIA) card, etc.

Control logic 928 may be transmitted to and from computer 900 via the communication medium 922.

The detailed descriptions of the above embodiments are not exhaustive descriptions of all embodiments contemplated by the inventors to be within the scope of the application. Indeed, persons skilled in the art will recognize that certain elements of the above-described embodiments may variously be combined or eliminated to create further embodiments, and such further embodiments fall within the scope and teachings of the application. It will also be apparent to those of ordinary skill in the art that the above-described embodiments may be combined in whole or in part to create additional embodiments within the scope and teachings of the application.

Thus, although specific embodiments of, and examples for, the application are described herein for illustrative purposes, various equivalent modifications are possible within the scope of the application, as those skilled in the relevant art will recognize. Accordingly, the scope of the application should be determined from the following claims.

We claim:

1. A method for evaluating a road hazard condition for a road segment, the method comprising the steps of:
   receiving remote weather data for the road segment;
   determining a precipitation type for the road segment using the remote weather data;
   determining the road hazard condition for the road segment using the precipitation type
   determining if a pavement temperature is received;
   in response to determining that a pavement temperature is received, determining a pavement condition for the road segment using the precipitation type and the pavement temperature; and in response to determining that the pavement temperature is not received, determining the pavement condition for the road segment using the precipitation type, wherein determining the road hazard condition for the road segment further includes using the pavement condition.

2. The method of claim 1, wherein the remote weather data includes at least one of radar data, satellite cloud classification data, and weather station air temperature data.

3. The method of claim 1, further comprising the step of: receiving first mobile data for the road segment, wherein determining the precipitation type for the road segment further includes using the first mobile data.

4. The method of claim 3, wherein the first mobile data includes at least one of a wiper status and a mobile air data.

5. The method of claim 3, further comprising the step of: receiving second mobile data, wherein determining the precipitation type for the road segment further includes using the second mobile data.

6. The method of claim 1, further comprising the steps of: receiving vehicle drive information; and determining a slickness flag for the road segment using the vehicle drive information, the precipitation type, and the pavement condition.

7. The method of claim 6, wherein the vehicle drive information includes at least one of an automatic brake system status, a traction status or a stability control observation, and a yaw rate.

8. The method of claim 1, further comprising the step of: determining a visibility level for the road segment using the precipitation type, wherein determining the road hazard condition for the road segment further includes using the visibility level.

9. The method of claim 8, further comprising the step of: receiving a wind speed, wherein determining the visibility level for the road segment further includes using the wind speed.

10. The method of claim 8, further comprising the step of: receiving visibility information, wherein determining the visibility level for the road segment further includes using the visibility information.

11. The method of claim 10, wherein the visibility information includes at least one of a relative humidity, a percentage of fog lights on, a percentage of high beams on, a speed ratio, a station visibility, a station-reported visibility type, a wildfire existence, a wind direction, and a dust existence indicator.

12. The method of claim 10, further comprising the step of: receiving automobile operation information, wherein determining the visibility level for the road segment further includes using the automobile operation information.

13. A system for assessing a road hazard condition for a road segment, the system comprising:

a precipitation type module to receive remote weather data for the road segment, to determine a precipitation type for the road segment using the remote weather data, and to determine the road hazard condition for the road segment using the precipitation type; and a pavement condition module to determine if a pavement temperature is received, in response to determining that a pavement temperature is received, to determine a pavement condition for the road segment using the precipitation type and the pavement temperature, and in response to determining that the pavement temperature is not received, to determine the pavement condition for the road segment using the precipitation type, wherein determining the road hazard condition for the road segment further includes using the pavement condition.

14. The system claim 13, wherein the remote weather data includes at least one of radar data, satellite cloud classification data, and weather station air temperature data.

15. The system of claim 13, further comprising:

a visibility level module to determine a visibility level for the road segment using the precipitation type, wherein determining the road hazard condition for the road segment further includes using the visibility level.

16. The system of claim 15, wherein the visibility level module is further configured to receive a wind speed, and wherein determining the visibility level for the road segment further includes using the wind speed.

17. The system of claim 13, further comprising:

a display module to display the road hazard condition for the road segment.

* * * * *